Dec. 19, 1961 F. B. HUGLE ET AL 3,013,956

METHODS OF ETCHING METALS IN THE PLATINUM GROUP
AND PRODUCING PRINTED CIRCUITS THEREFROM

Filed April 5, 1957

INVENTORS
Frances B. Hugle
William B. Hugle
BY
Graf, Nierman & Burmeister
Attorneys

1

3,013,956

METHODS OF ETCHING METALS IN THE PLATINUM GROUP AND PRODUCING PRINTED CIRCUITS THEREFROM

Frances B. Hugle and William B. Hugle, Union Township, Clermont County, Ohio, assignors to The Baldwin Piano Company, Cincinnati, Ohio, a corporation of Ohio Filed Apr. 5, 1957, Ser. No. 651,009
21 Claims. (Cl. 204—143)

The present invention relates generally to methods of etching metals in the "platinum group" and more particularly to methods of manufacturing printed circuits with these metals.

Recently, printed circuit techniques have been applied to the fabrication of photocells. In accordance with these techniques, an electrically conducting coating is disposed upon an electrically insulating substrate or base, and a resist is disposed upon the coating of electrically conducting material in the desired pattern to form two confronting spaced electrodes. The entire assembly is then immersed in a bath of solvent which removes the portion of the electrically conducting coating which is not protected by the resist. The resist is then removed, leaving two confronting spaced electrically conducting electrodes on an electrically insulating base. A mass of photoconductor material, generally of the semiconductor class, is then disposed on the base between the electrodes and in contact with the electrodes, this step generally requiring the application of heat. The patent application of the present inventors entitled "Semi-Conductive Films and Methods of Producing Them," Serial No. 574,804, filed March 29, 1956, illustrates photocells constructed in this manner.

It is often desirable that the confronting electrodes of a photocell constructed in this manner be spaced by a small distance. As a result, the mass of photoconductor material extending between the electrodes is also small. It has been found that the performance of photocells constructed in this manner has been adversely affected by diffusion of the electrode material into the photoconductor material. Generally, Inconel is employed for the electrodes, and this material diffuses into the photoconductor materials to produce a deleterious effect upon the photocell operation. Diffusion of the electrode material into the photoconductor material of the photocell and the deleterious effects thereof can be substantially eliminated by employing certain metals of the platinum group (the lower two rows of group VIII of the periodic table) as the electrode material. Rhodium and platinum, for example, will not diffuse to any substantial degree into the photoconductor materials employed in photocells. However, prior to the present invention, most of the platinum group metals could not be etched, since the acids which will attack them also destroy the resists known to the art. The conventional method of removing rhodium, for example, from a glass mirror is to employ concentrated boiling sulfuric acid which is unsuitable in an etching process.

One well known method of catalyzing the dissolution of metals is to place the metal to be dissolved in contact with a metal lower in the electromotive series, and then place the two metals in an acid electrolyte. Under these conditions, the metal which is lower in the electromotive series catalyzes the dissolution of the other metal. The three lowest metals of the electromotive series listed in the Handbook of Chemistry and Physics, Chemical Rubber Publishing Co., 1953, are palladium, platinum and gold, in declining order. Rhodium catalyzes the dissolution of all three of these metals in the presence of an electrolyte, thus acting as if rhodium were lower in the electromotive series than the other of these metals.

2

It is one of the objects of the present invention to provide a method of dissolving metals in the platinum group with a solvent which will not substantially attack conventional resist materials. It is a further object of the present invention to provide a method for etching such metals. Also, it is an object of the present invention to provide an etching process for fabricating printed circuits with platinum group conductors.

The inventors have found that a body of a platinum group metal may be dissolved by disposing the body in a hydrohalic acid electrolyte and adjusting the potential of the body to be negative relative to the electrolyte. The inventors have also found that the proper potential relation between the electrolyte and the metal body may be achieved by placing a second metal mass in contact with the body which has a contact potential relative to the body making the body negative with respect to the second mass by the desired magnitude. More specifically, rhodium and platinum bodies may be dissolved in an electrolyte, and hence etched, by disposing a mass of metal with a positive contact potential relative to the body of the order of that of lead on the surface of the body before placing it in contact with the electrolyte which includes a halogen acid. As a result of this discovery, a rhodium or platinum body may be etched by placing a layer of resist on the body in the pattern desired to be etched, placing a mass of metal with a contact potential relative to the body of the order of that of lead on the body, and bringing the body and mass into contact with an electrolyte containing a hydrohalic acid which will not appreciably attack the resist. Electrical printed circuits may thus be fabricated by coating an electrically insulating substrate or base with rhodium, or platinum, placing a resist on the rhodium or platinum in the pattern of the electrical conductors, bringing the exposed portion of rhodium or platinum into contact with an electrolyte including a hydrohalic acid and causing the rhodium or platinum body to assume a negative potential relative to the electrolyte. The invention will be more clearly understood from a further reading of this disclosure, particularly when viewed in the light of the drawings, in which:

Figure 1:
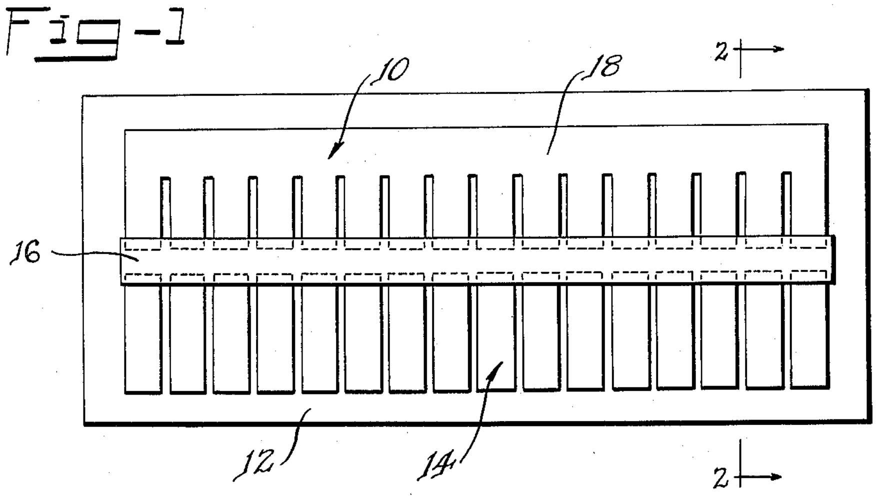
FIGURE 1 is an elevational view of a photocell assembly constructed according to the teachings of the present invention.

In its completed form, the photocell assembly has a first group 10 of spaced parallel bar-shaped electrodes disposed upon a substrate or base 12 of electrically insulating material in the form of a plate. A second group 14 of parallel elongated spaced bar-shaped electrodes confronts the electrodes of the first group 10, one of the electrodes of the second group 14 being aligned with each of the electrodes of the first group 10. A ribbon 16 of photoconductive material of the semiconductor class is also disposed upon the base plate 12 and contacts each of the electrodes of both groups 10 and 14. The photocell assembly is intended for use in an analogue to digital optical encoder in which the regions between electrodes of each group are masked off from illumination, although it is to be understood that the photocell assembly has applications in addition to that of an optical encoder. The group 10 of electrodes is fabricated as an integral unit due to a bar-shaped portion 18 which extends between each of the electrodes of the group 10 remote from the ends of the electrodes confronting the electrodes of the group 14, thus forming a common connection for the electrodes in group 10.

The base plate 12 must be constructed of electrically insulating material and must not be soluble in the electrolyte. Glass has been found to be a preferred material for the base plate 12, although ceramics and plastics may also be employed.

Figure 3:
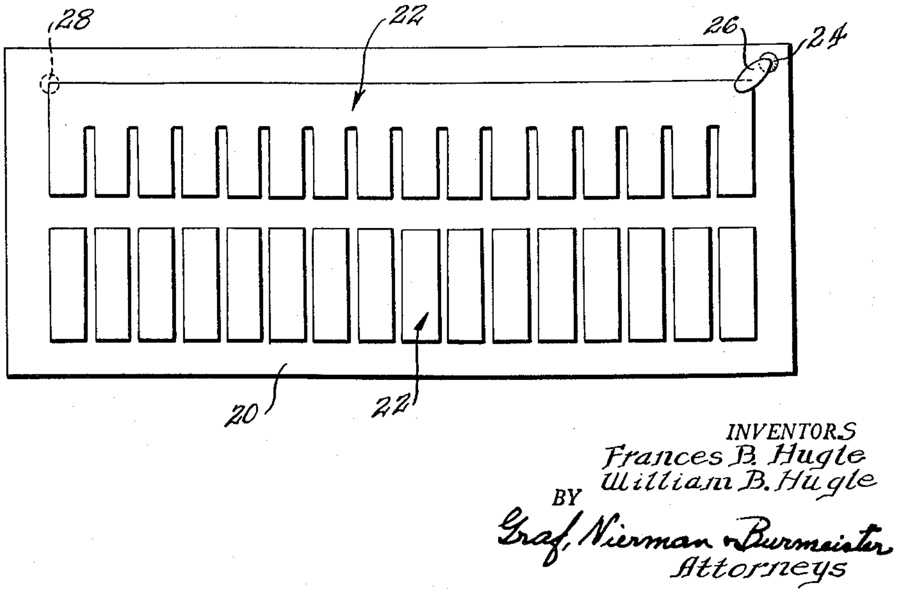
FIGURE 3 is an elevational view of the photocell assembly shown in FIGURES 1 and 2 during the process of manufacture.

The first step in the fabrication of the photocell assembly is to place a coating of a metal of the platinum group, such as rhodium, designated 20 in FIGURE 3, on one surface of the base plate 12. Since rhodium coating of glass is conventional in the manufacture of mirrors, this step will not be further described.

After the coating 20 has been placed upon a surface of the glass plate 12, a suitable resist 22 in layer form having the pattern of the two groups 10 and 14 of electrodes is disposed upon the coating 20. This may be accomplished by "painting" a resist 22 onto the coating 20 through a stencil; suitable resists for this process being thermoplastic enamels or wax and rosin mixtures. Photographic resists may also be employed. The photographic method of placing the pattern of resist upon the coating is more accurate than the stencil method, and the inventors have found that commercially available photographic resists are particularly satisfactory.

When employing a photographic method of disposing a resist in the pattern of the two groups of electrodes upon the coating 20, optical means are employed to expose the resist with an image of the desired pattern. Thereafter, the photographic resist is developed, usually by placing the base plate 12 and exposed resist 22 in a developer. Suitable developers are available commercially for commercially available photographic resists.

When contact potential is employed to maintain the proper potential difference between the electrolyte and the coating 20, a mass or lump 24 of metal which forms a couple with the coating 20 to produce the required potential difference is also placed upon the coating 20. The lump 24 may be placed upon the coating 20 either before or after the resist 22, but in any event must be at least partially exposed from the resist. FIGURE 3 illustrates in solid lines the lump 24 spaced from the pattern of resist 22, and this is the situation when the resist 22 is placed upon the coating 20 prior to the lump.

When the lump 24 is spaced from the resist pattern, the coating 20 will dissolve when immersed in an electrolyte in the region immediately adjacent to the lump 24, and after continuity of the lump and coating 20 is broken, the reaction will cease. In order to maintain continuity between the lump 24 and the coating 20 during the etching process, a mass of masking material, designated 26 in FIGURE 3, is disposed between the lump 24 and the resist 22. Wax has been found to be a suitable masking compound for the mass 26. When the base plate 12, coating 20, resist 22, lump 24 and mass 26 of masking compound are immersed in an electrolyte bath, dissolution of the coating 20 proceeds from the pattern of resist outwardly until all of the exposed coating is removed. The mass 26 of masking compound may then be physically scraped from the coating 20 and the assembly re-immersed in the bath of electrolyte to remove the strip that has maintained contact with the lump 24. This step is generally unnecessary, since the presence of the lump 24 in electrical contact with one group of electrodes generally facilitates electrical connections.

If the lump 24 is partially covered by the resist 22, as indicated by the dotted lines in FIGURE 3 and designated 28, the mass of masking material 26 is not necessary. Continuity between the lump and coating 20 is achieved by the resist itself.

The electrolyte employed must not appreciably attack the resist. Further, the inventors have found that for the dissolution of platinum group metals, the electrolyte must contain a hydrohalic acid, that is, an aqueous solution of HF, HCl, HBr and HI. Dilute hydrochloric acid has been found to be a particularly suitable electrolyte.

When dissolving a rhodium coating in a halogen acid electrolyte, the proper potential relation between the rhodium body and the electrolyte is obtained by placing a lead-tin lump, commonly known as "solder," on the surface of the rhodium body, or coating 20. Solder with equal parts of lead and tin have been found to be particularly advantageous, although lead alone, iron, and cadmium may also be employed. Solder is considered preferable due to the ease with which it can be attached to the coating, and to its resistance to attack by the electrolyte. Platinum will also dissolve in halogen acid electrolytes with a lump of lead, lead-tin, iron, or cadmium in contact with the platinum body.

After the etching process is completed, the resist defining the electrodes is removed. If commercially available photographic resists are employed, this may be accomplished by immersion in methyl ethyl ketone. The resist may also be removed by physical methods, such as scraping.

The material employed for the photoconductive ribbon may be any photosensitive material. It has been found that particularly satisfactory photosensitive materials are those of the semiconductor class. Cadmium selenide, cadmium sulfide, lead sulfide, lead selenide, zinc selenide, zinc sulfide, zinc telluride, cadmium telluride, germanium, silicon and lead telluride have all been found to be suitable.

Solder, in the form generally employed and referred to in this specification, is a mixture of lead and tin. Solder, like other lead and tin alloys, contains a eutectic of lead and tin depending upon the relative proportions of the lead and tin in the alloy.

*Example I*

The base 12 is a sheet of plate glass, and it is provided with a rhodium coating 20. The rhodium coating 20 is then provided with a layer of commercially available photographic resist, and the pattern of the two groups 10 and 14 of electrodes is then focused upon the photographic resist to expose it. The photographic resist is then developed in a developer for the photographic resist. A drop of solder 24 is placed upon the rhodium coating 20 spaced from the resist pattern 22. A lump 26 of wax is then placed upon the rhodium coating 20 between the lump of solder 24 and the resistant pattern 22, the wax extending into contact with both the solder and the resist pattern. The solder employed is 50—50 solder, i.e., equal parts of lead and tin. A bath containing a normal solution of hydrochloric acid at room temperature is employed to dissolve the rhodium coating 20, and does not appreciably attack the glass base plate 12 or the resist pattern 22. The resist 22 is then removed by immersion in a bath of methyl ethyl ketone, and the ribbon 16 is formed by evaporating a layer of cadmium and selenium onto the base plate 12 and the two groups 10 and 14 of rhodium electrodes formed by the etching process, and heating for a period of one hour at 400° C.

*Example II*

A coating of rhodium is placed on a sheet of ceramic. A mass of iron is disposed in contact with the rhodium coating. Following the application of the iron mass, the resist consisting of 50% rosin and 50% wax is applied to the rhodium coating with a stencil and brush in the desired pattern. The resist is positioned on the rhodium coating to partially cover the edge of the iron mass. The ceramic, rhodium coating, resist and iron mass are then immersed in a bath of concentrated hydrofluoric acid at room temperature. The ceramic, rhodium coating, resist and iron mass are then immersed for the period sufficient to dissolve the unprotected portion of the rhodium coating, approximately five to ten minutes. A suitable solvent is then employed to remove the wax and rosin composition from the confronting ends of electrodes of both groups. A ribbon is then formed by evaporating a layer of lead and selenium on the plate and electrodes between and in contact with the confronting ends of the electrodes of the two groups. The base, electrodes and ribbon are then baked at a temperature of 400° C. for a period of one hour.

*Example III*

A platinum coating may be etched and used to form the electrodes of a photocell by substituting platinum for rhodium in either of the foregoing examples.

Also in the foregoing examples, cadmium, or alloys of lead, cadmium and iron may be substituted for the solder or iron. Best results, however, have been achieved by employing solder consisting of 50% lead and 50% tin. Further, it is not necessary that the lump be bonded to the rhodium or platinum surface, as is the case with soldering. The mass of material may be maintained in contact with the rhodium coated surface in any suitable manner. For example, a clip may be coated with solder and clipped on the base plate either before or during immersion so that it contacts the rhodium surface.

Also, the electrolytes may be replaced in Example I, Example II and Example III by mixtures of acids as long as one of the acids in the mixture is a halogen acid. For example, a solution of hydrochloric and sulfuric acid may be employed, or a solution consisting of 50% aqua regia and 50% HF and HCl. In like manner, other halogen acids may be substituted for those disclosed in the above examples, for example iodic acid.

Figure 4:
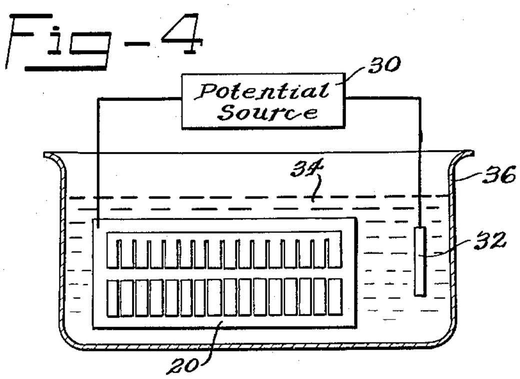
FIGURE 4 is a schematic view of a device for practicing the invention.
Figure 2:
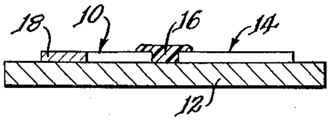
FIGURE 2 is a sectional view taken along the line 2—2 of FIGURE 1.

FIGURE 4 illustrates the method of etching platinum group metals in a halogen acid electrolyte with a potential source, according to the teachings of the present invention. The electric potential source, designated 30, is connected between an electrically conducting electrode 32 and the coating 20 of metal of the platinum group, the negative terminal of the source 30 being connected to the coating 20. Both the electrode 32 and the work piece including the coating 20 are immersed in a body 34 of electrolyte including a halogen acid which is illustrated disposed within a vessel 36.

The inventors have found that the coating 20 must be maintained at a negative potential relative to the electrolyte. When the coating consists of rhodium and the electrolyte hydrochloric acid, this potential supplied by the source must be between 0.75 volt and 1.00 volt for optimum results.

EXAMPLE IV

The base 12 is a sheet of plate glass, and it is provided with a rhodium coating 20. The rhodium coating 20 is then provided with a layer of Kodak "Photo Resist," and the pattern of the two groups 10 and 14 of electrodes is then focused upon a photographic resist to expose it. The photographic resist is then developed in a developer for the photographic resist. A brass electrode is disposed in a bath of 1.0 normal solution of hydrochloric acid at room temperature, and connected to the positive terminal of a potential source. The negative terminal of the potential source is connected to the coating of rhodium by a copper wire, and the coating is immersed in the hydrochloric acid. The potential source is adjusted to make the coating 0.82 volt negative relative to the electrolyte, and the dissolution of the rhodium is permitted to complete. The resist 22 is then removed by immersion in a bath of methyl ethyl ketone, and the ribbon 16 is formed by evaporating a layer of cadmium and selenium onto the base plate 12 and the two groups 10 and 14 of rhodium electrodes formed by the etching process, and heating for a period of one hour at 400° C.

Similar processes can be carried out for dissolving and etching platinum and the other elements of the platinum group.

The foregoing disclosure has illustrated the invention employed in the manufacture of photocell assemblies, however, the invention is clearly applicable to any form of printed circuit. Also, the invention is clearly applicable to etching any body of platinum group metal or metals, whether for utilitarian or artistic purposes.

From the foregoing disclosure, those skilled in the art will readily devise modifications of the invention within the intended scope thereof. It is therefore intended that the scope of this invention be not limited by the foregoing disclosure, but rather only by the appended claims.

The invention claimed is:

1. The method of etching a pattern in a body of metal in the platinum group comprising the steps of contacting the body with a mass of metal from the group consisting of lead, lead-tin, iron and cadmium, placing a layer of resist in the desired pattern on the body, and placing the resist, body, and at least a portion of the metal mass in contact with an electrolyte consisting essentially of a hydrohalic acid, the contact potential of the mass and body making the body electrically negative with respect to the electrolyte.

2. The method of etching an electrical circuit in a rhodium layer comprising the steps of coating a surface of a base constructed of electrically insulating material with a layer of rhodium, placing a mass of metal of the group consisting of lead, lead-tin, iron and cadmium on a portion of the surface of the rhodium layer, placing a layer of resist on the rhodium layer in the desired pattern, and placing the layer of resist, rhodium layer, and at least a portion of the metal mass in contact with an electrolyte consisting essentially of a hydrohalic acid, the contact potential of the mass and body making the body electrically negative with respect to the electrolyte.

3. The method of etching an electrical circuit in a layer of rhodium comprising the steps of coating a surface of a glass plate with a layer of rhodium, placing a mass of solder comsisting essentially of a mixture of lead and tin on a portion of the surface of the rhodium layer, placing a layer of photographic resist on the rhodium layer, optically exposing a pattern of the desired electrical circuit on the photographic resist, developing the resist, and immersing the glass plate, rhodium layer, at least a portion of the mass of solder, and developed resist in an electrolyte consisting of hydrochloric acid, the contact potential of the mass and rhodium layer making the layer electrically negative with respect to the electrolyte.

4. A method of etching a pattern in a rhodium body comprising the steps of placing a mass of solder consisting essentially of a mixture of lead and tin on a portion of the surface of the rhodium body, placing a layer of photographic resist on the rhodium body, exposing the desired pattern on the photographic resist, developing the photographic resist, and immersing the body, mass of solder, and developed resist in an electrolyte consisting essentially of hydrohalic acid, the contact potential of the mass and body making the body electrically negative with respect to the electrolyte.

5. The method of etching an electrical circuit in rhodium comprising the steps of placing a mass of solder consisting essentially of a mixture of lead and tin on a portion of the surface of the rhodium body, placing a layer of photographic resist on the rhodium body, exposing the desired pattern on the photographic resist, developing the photographic resist, and immersing the body, mass of solder, and developed resist in an electrolyte consisting of hydrofluoric acid, the contact potential of the mass and body making the body electrically negative with respect to the electrolyte.

6. The method of etching an electrical circuit in a layer of rhodium comprising the steps of coating a surface of a glass plate with a layer of rhodium, placing a mass of solder consisting essentially of a mixture of lead and tin in equal parts on a portion of the surface of the rhodium layer, placing a layer of photographic resist on the rhodium layer, optically exposing a pattern of the desired electrical circuit on the photographic resist, developing the resist, immersing the glass plate, rhodium layer, at least a portion of the mass of solder, and developed resist in an electrolyte consisting of hydrochloric acid, the contact potential of the mass of solder and rhodium layer making the rhodium layer electrically negative with respect to the electrolyte, and then immersing the glass plate, resist and remaining rhodium layer in methyl ethyl ketone to remove the remaining resist.

7. The method of etching a pattern in a rhodium body comprising the steps of placing a mass of solder consisting essentially of a mixture of lead and tin on a portion of the surface of the rhodium body, placing a layer of resist in the desired pattern on the rhodium body, placing the resist, rhodium body, and at least a portion of the mass of solder in contact with an electrolyte consisting essentially of a hydrohalic acid, the contact potential of the mass and body making the body electrically negative with respect to the electrolyte, and removing the remaining resist.

8. The method of etching an electrical circuit in a layer of rhodium comprising the steps of coating a surface of a glass plate with a layer of rhodium, placing a mass of solder consisting of a mixture of lead and tin in equal parts on a portion of the surface of the rhodium layer, placing a layer of photographic resist on the rhodium layer, optically exposing a pattern of the desired electrical circuit on another region of the photographic resist, developing the resist, placing a mass of wax between the mass of solder and the pattern of resist, and immersing the glass plate, rhodium layer, at least a portion of the mass of solder, and developed resist in an electrolyte consisting of hydrochloric acid, the contact potential of the mass of solder and rhodium layer making the rhodium layer electrically negative with respect to the electrolyte.

9. The method of etching an electrical circuit in a layer of rhodium comprising the steps of coating a surface of a base constructed of electrically insulating material with a layer of rhodium, placing a mass of solder consisting essentially of a mixture of lead and tin on a portion of the surface of the rhodium layer, placing a layer of resist on another portion of the rhodium layer in the desired pattern, placing a mass of masking material between the solder and pattern of resist, and placing the resist, rhodium layer, and at least a portion of the mass of solder in contact with an electrolyte consisting essentially of a hydrohalic acid, the contact potential of the mass and rhodium layer making the layer electrically negative with respect to the electrolyte.

10. The method of etching an electrical circuit in a layer of rhodium comprising the steps of coating one surface of a glass plate with a layer of rhodium, placing a layer of resist of wax and rosin in a desired pattern on the rhodium layer, placing a mass of solder consisting essentially of a mixture of lead and tin on the rhodium layer spaced from the resist, placing a mass of wax on the rhodium layer extending between the mass of solder and the resist, immersing the glass plate, rhodium layer, and resist layer in an electrolyte consisting of hydrochloric acid to dissolve the rhodium layer adjacent to the layer of resist, mass of wax, and lump of solder, the contact potential of the mass of solder and layer of rhodium making the layer of rhodium electrically negative with respect to the electrolyte, and removing the exposed portion of the resist layer to expose the confronting rhodium electrodes.

11. The method of etching an electrical circuit in a layer of rhodium comprising the steps of coating a surface of a base constructed of an electrically insulating material with a layer of rhodium, placing a mass consisting essentially of iron on a portion of the surface of the rhodium layer, placing a layer of resist on the rhodium layer in the desired pattern, and placing the resist, rhodium layer, and at least a portion of the iron mass in contact with an electrolyte consisting essentially of a hydrohalic acid, the contact potential of the mass of iron and rhodium layer making the layer electrically negative with respect to the electrolyte.

12. The method of etching an electrical circuit in a layer of rhodium comprising the steps of coating a surface of a base constructed of an electrically insulating material with a layer of rhodium, placing a mass consisting essentially of cadmium on a portion of the surface of the rhodium layer, placing a layer of resist on the rhodium layer in the desired pattern and placing the resist, rhodium layer, and at least a portion of the cadmium mass in contact with an electrolyte consisting essentially of a hydrohalic acid, the contact potential of the mass of cadmium and rhodium layer making the layer electrically negative with respect to the electrolyte.

13. The method of etching an electrical circuit in a layer of rhodium comprising the steps of coating a surface of a base constructed of an electrically insulating material with a layer of rhodium, placing a mass consisting essentially of lead on a portion of the surface of the rhodium layer, placing a layer of resist on the rhodium layer in the desired pattern, and placing the resist, rhodium layer, and at least a portion of the lead mass in contact with an electrolyte consisting essentially of a hydrohalic acid, the contact potential of the mass of lead and layer of rhodium making the layer electrically negative with respect to the electrolyte.

14. The method of etching a pattern in rhodium comprising the steps of placing a mass consisting essentially of iron on a portion of the surface of the rhodium body, placing a layer of resist in the desired pattern on the rhodium body, and placing the resist, rhodium body and at least a portion of the mass of iron in contact with an electrolyte consisting essentially of a hydrohalic acid, the contact potential of the mass and body making the body electrically negative with respect to the electrolyte.

15. The method of etching a pattern in rhodium comprising the steps of placing a mass consisting essentially of cadmium on a portion of the surface of the rhodium body, placing a layer of resist in the desired pattern on the rhodium body, and placing the resist, rhodium body and at least a portion of the mass of cadmium in contact with an electrolyte consisting essentially of a hydrohalic acid, the contact potential of the mass and body making the body electrically negative with respect to the electrolyte.

16. The method of etching a pattern in rhodium comprising the steps of placing a mass consisting essentially of lead on a portion of the surface of the rhodium body, placing a layer of resist in the desired pattern on the rhodium body, and placing the resist, rhodium body and at least a portion of the mass of lead in contact with an electrolyte consisting essentially of a hydrohalic acid, the contact potential of the mass and the body making the body electrically negative with respect to the electrolyte.

17. The method of dissolving a metal body of the platinum group comprising the steps of placing the metal body of the platinum group in contact with an electrolyte consisting essentially of a hydrohalic acid, and contacting the body with a mass of metals of the group consisting of lead, lead-tin, iron and cadmium, said mass being in contact with the electrolyte, the contact potential of the mass and body making the body electrically negative with respect to the electrolyte.

18. The method of dissolving a body of platinum comprising the steps of placing the platinum body in contact with an electrolyte consisting essentially of a hydrohalic acid, and contacting the body and electrolyte with a mass consisting essentially of lead, the contact potential of the metal mass and body making the body electrically negative with respect to the electrolyte.

19. The method of dissolving a body of platinum comprising the steps of placing the platinum body in contact with an electrolyte consisting essentially of a hydrohalic acid, and contacting the body and electrolyte with a mass consisting essentially of iron, the contact potential of the mass and body making the body electrically negative with respect to the electrolyte.

20. The method of dissolving a body of platinum comprising the steps of placing the platinum body in contact with an electrolyte consisting essentially of a hydrohalic acid, and contacting the body and electrolyte with a mass consisting essentially of cadmium, the contact potential of the mass and body making the body electrically negative with respect to the electrolyte.

21. The method of dissolving a body of platinum comprising the steps of placing the platinum body in contact with an electrolyte consisting essentially of a hydrohalic acid, and contacting the body and electrolyte with a mass consisting essentially of solder with approximately equal parts of lead and tin, the contact potential of the mass and body making the body electrically negative with respect to the electrolyte.

References Cited in the file of this patent

UNITED STATES PATENTS

| | | |
|---|---|---|
| 1,779,457 | Zschiegner | Oct. 28, 1930 |
| 2,057,272 | Schumpelt | Oct. 13, 1936 |
| 2,370,871 | Marks | Mar. 6, 1945 |
| 2,421,607 | Fowler | June 3, 1947 |
| 2,702,252 | Sachoff | Feb. 15, 1955 |
| 2,758,074 | Black et al. | Aug. 7, 1956 |

OTHER REFERENCES

Journal of the Electro Chemical Society, vol. 80, 1941, pp. 489–498.